(12) United States Patent
Rose et al.

(10) Patent No.: US 6,521,128 B1
(45) Date of Patent: Feb. 18, 2003

(54) TREATMENT OF WATER CONTAINING CARBONACEOUS SOLIDS

(75) Inventors: Peter Dale Rose, Grahamstown (ZA); Oliver O'Connor Hart, Grahamstown (ZA)

(73) Assignee: Water Research Commission, Rietfontein (ZA)

( * ) Notice: Subject to any disclaimer, the term of this patent is extended or adjusted under 35 U.S.C. 154(b) by 0 days.

(21) Appl. No.: 09/807,651

(22) PCT Filed: Oct. 14, 1999

(86) PCT No.: PCT/IB99/01675

§ 371 (c)(1), (2), (4) Date: Jun. 13, 2001

(87) PCT Pub. No.: WO00/21891

PCT Pub. Date: Apr. 20, 2000

(30) Foreign Application Priority Data

Oct. 15, 1998 (ZA) .................................................. 98/9428

(51) Int. Cl.[7] .................................................. C02F 3/00

(52) U.S. Cl. ........................ 210/603; 210/610; 210/607; 210/623; 210/757; 210/768; 210/805; 210/912; 210/719; 210/739

(58) Field of Search .............................. 210/603, 610, 210/607, 623, 757, 768, 805, 912, 719, 739

(56) References Cited

U.S. PATENT DOCUMENTS 4,519,912 A 5/1985 Kauffman et al.
4,522,723 A 6/1985 Kauffman et al.

FOREIGN PATENT DOCUMENTS

EP 0436254 7/1991
WO 9403403 2/1994

Primary Examiner—Chester T. Barry
(74) Attorney, Agent, or Firm—James Ray & Associates

(57) ABSTRACT

A process for treating which contains carbonaceous solids, includes subjecting the water to hydrolysis in a biological hydrolysis reaction stage, in the presence of sulfate ions, thereby to produce treated water, a slurry component, and a sulfur-containing component. Treated water, the slurry component, and the sulfur-containing component are withdrawn from the reaction stage.

13 Claims, 1 Drawing Sheet

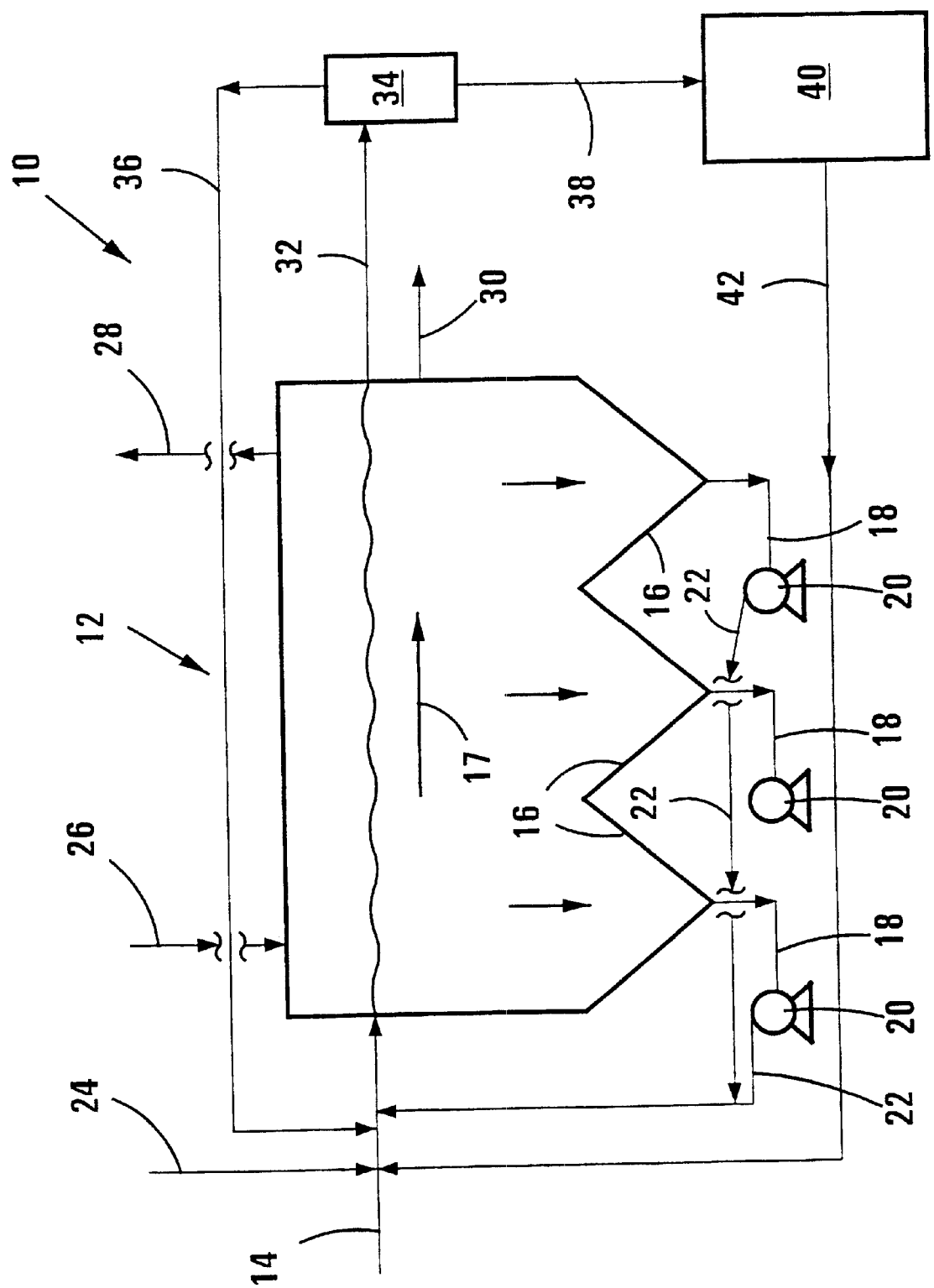

TREATMENT OF WATER CONTAINING CARBONACEOUS SOLIDS

THIS INVENTION relates to the treatment of water. More particularly, the invention relates to the treatment of water which contains carbonaceous solids. Still more particularly, the invention relates to a process for treating water which contains carbonaceous solids.

According to the invention, there is provided a process for treating water which contains carbonaceous solids, which process includes subjecting water which contains carbonaceous solids, to hydrolysis in a biological hydrolysis reaction stage, in the presence of sulphate ions, thereby to produce treated water, a slurry component, and a sulphur-containing component; and withdrawing treated water, the slurry component, and the sulphur-containing component from the reaction stage.

The process envisages that the water will normally be fed continuously into the reaction stage, and that treated water will normally be withdrawn continuously from the reaction stage, while the slurry component and the sulphur-containing component can be withdrawn either continuously or intermittently, depending on the reaction stage design and the build-up of these components n the reaction stage.

The carbonaceous solids in the water may be pre-settled or thickened, prior to subjecting the water to the biological hydrolysis reaction stage. The water may thus be in the form of a concentrate.

In the reaction stage, biological reduction of the sulphate ions takes place, so that the sulphate ions are converted to sulphides. The carbonaceous solids-containing water has the effect of adding metabolizable carbon to the reaction stage, for metabolization by the organisms involved in the biological sulphate reduction. The metabolizable carbon source may comprise an organic carbon source which exhibits a high chemical oxygen demand ('COD'). In one embodiment of the invention, the carbonaceous solids-containing water may be a waste water. It may thus be an effluent or waste product comprising organic material dissolved, suspended and/or carried in waste water, such as sewage, e.g. primary sewage sludge or secondary sewage sludge; settled sewage; settled sewage solids; tannery waste water; brewery waste water; starch manufacture waste water; winery waste water; and paper pulp waste water. In another embodiment of the invention, the carbonaceous solids-containing water may be water in which the carbonaceous solids are suspended, such as water containing fine lignocellulosic material. Such waters provide metabolizable organic carbon and the necessary organisms for biological sulphate reduction in the reaction stage.

The carbonaceous solids-containing water may naturally contain the necessary sulphate ions for the required biological sulphate reduction to take place in the reaction stage. However, it is envisaged that the water will normally be deficient in sulphate ions, and the process may thus include adding a source of sulphate ions to the carbonaceous solids-containing water ahead of the reaction stage and/or to the reaction stage itself. In principle, any convenient source of sulphate ions can be used.

Thus, in one embodiment of the invention, the source of sulphate ions may be mine effluent or industrial waste water. Such water normally also contains dissolved heavy metal cations, such as ferrous cations, together with dissolved sulphate anions. The process may then include pretreating the mine effluent or industrial waste water to remove the heavy metals therefrom, before adding it to the carbonaceous solids-containing water or to the reactor as pretreated sulphate-containing waste water. The pretreatment may comprise adding a sulphide to the mine effluent or industrial waste water, with the sulphide reacting with heavy metal(s) in the mine effluent or industrial waste water, thereby to cause precipitation of the heavy metal(s) from the mine effluent or industrial waste water as metal sulphides; and separating the precipitated metal sulphides from the waste water, to obtain the pretreated sulphate-containing waste water, which is then used in the process.

In the pretreatment of the mine effluent or industrial waste water, the sulphide that is added thereto may be in liquid or gaseous form. For example, it may be in the form of hydrogen sulphide.

The separation of the precipitated metal sulphides from the pretreated sulphate-containing waste water will thus be effected in a separation stage, which may comprise a settler.

However, in another embodiment of the invention, any other sulphide-containing waste water can be used as the source of sulphate ions. In yet another embodiment of the invention, one or more sulphate salts can instead, or additionally, be used as the source of sulphate ions.

The biological hydrolysis reaction stage may, in particular, comprise an accelerated hydrolysis reactor in which, as the carbonaceous solids-containing water flows along the reactor from one end thereof to the other, hydrolysis of the solids component thereof into non-digestible or refractory COD material, hereinafter also referred to as 'RefCOD material'; slowly biodegradable COD material, hereinafter also referred to as 'SBCOD material', and readily biodegradable COD material, hereinafter also referred to as 'RBCOD material', takes place. At least some of the RefCOD and SBCOD material has a larger particle size than the RBCOD material, which has a particle size which is typically of the order of about 0.1 $\mu$m and smaller. The RefCOD and SBCOD materials typically have particle sizes in the range 60 to 100 microns. Thus, at least some of the RefCOD and SBCOD material thus settles to the bottom of the reactor as the water passes along the reactor, to be withdrawn as the slurry component. Typically, substantially all of the RefCOD and SBCOD material settles to the bottom of the reactor. At least some of the RBCOD material is withdrawn from the reactor as part of the treated water. The treated water, which thus contains solubilized/suspended material, may then be subjected to known dissolved/suspended solids treatment. Alternatively, solubilized organic material in the treated water can be used as a carbon source for nutrient removal or for tertiary water treatment operations such as nitrate (or N) and phosphate (or P) removal.

The accelerated hydrolysis reactor may comprise, at or in its bottom or base, a plurality of valleys in which the settled material collects.

The settled material can then be recycled to the reactor, preferably with shearing thereof, e.g. by means of a high shear pump. In this fashion, in addition to the hydrolysis, fractionation of the RefCOD and SBCOD material, into RBCOD material, occurs.

Typically, the accelerated hydrolysis reactor may comprise three of the valleys. The settled material from each of the valleys may be recycled to the inlet end of the reactor. Instead, however, the settled material of the second and third valleys can be recycled to the reactor downstream of its inlet end, e.g. to above the second and third valleys respectively.

At least some of the sulphides which form during the biological sulphate reduction may be in the form of gaseous hydrogen sulphide, which collects in a head space of the reactor. The withdrawal of the hydrogen sulphide as the, or as a portion of the, sulphide-containing component, may then include purging this head space with an inert gas, such as nitrogen, and withdrawing a combined hydrogen sulphide/inert gas stream from the reactor head space. Hydrogen sulphide can then be recovered from this gaseous stream. The recovered hydrogen sulphide can then typically be used as the sulphide required for precipitation of metals from the waste water. Instead, if desired, the gas stream can be subjected to sulphide oxidation, thereby to obtain sulphur or, alternatively, sulphate as a product. Alternatively, at least some of the sulphide may be added to the water to be treated, ie to the influent stream, to initiate the hydrolysis reaction.

Instead, or additionally, the redox potential in the head space of the reactor can be controlled so that oxidation of sulphide to elemental sulphur in a surface layer of water in the reactor takes place. This sulphur surface layer is then withdrawn as the, or as part of the, sulphur-containing component. The process may then include subjecting this component to separation to separate the sulphur from the water, with the water then typically being returned to the reactor. The sulphur may then be oxidized to sulphate, e.g. by means of biological sulphur oxidation, with the resultant sulphates being routed back to the reactor as at least part of the source of sulphate ions.

BRIEF DESCRIPTION OF THE DRAWING

The single FIGURE is a diagrammatic illustration of the process for treatment of water containing carbonaceous solids according to the present invention.

The invention will now be described in more detail with reference to the accompanying diagrammatic drawing of a process according to the invention for treating sewage sludge.

In the drawing, reference numeral 10 generally indicates a process for treating sewage sludge. It will, however, be appreciated that the process 10 can also be used to treat other waste water and water containing suspended carbonaceous solid material.

The process 10 comprises an accelerated hydrolysis reactor 12, which is in the form of a so-called Falling Sludge Bed Reactor ('FSBR'), with a sewage sludge flow line 14 leading into one end of the reactor 12. The hydrolysis reactor 12 typically comprises, at its bottom, three valleys 16 which are staggered in the direction of water flow through the reactor, as indicated by arrow 17, and extend transversely to the direction of water flow through the reactor 12. However, a greater or lesser number of valleys 16 can be provided, if desired. A sediment or slurry withdrawal line 18 leads from each valley to a high shear pump 20, with a discharge line 22 leading from each pump 20 to the flow line 14. Instead, however, the pumps 20 associated with the second and third valleys can have discharge lines leading back into the reactor 12 above or ahead of the respective valleys. A sulphate addition line 24 leads into the flow line 14 ahead of the reactor 12.

A nitrogen addition line 26 leads into the top of the reactor near the water inlet end thereof, with a gaseous stream withdrawal line 28 leading from the top of the reactor near the water outlet end thereof. The line 28 leads to a suitable separation stage (not shown).

A treated water withdrawal line 30 leads from the far end of the reactor, as does a flow line 32 for withdrawing a sulphur-containing surface layer of water from the reactor 12. The flow line 32 passes to a separation stage 34 where sulphur is separated from water, with a water return line 36 leading from the stage 34 back to the flow line 14. A flow line 38 leads from the stage 34 to a biological sulphur oxidation stage 40, with a flow line 42 leading from the stage 40 back to the flow line 14.

In use, sewage sludge, such as primary sewage, is fed continuously into the reactor 12 along the flow line 14. Sufficient sulphate ions are added along the flow line 24 so that the concentration of sulphate ions in the sewage sludge is above 500 mg/l, preferably between 1000 and 2000 mg/l. The source of sulphate ions may, for example, be mine water from which heavy metals, such as ferrous cations, have been precipitated out by means of hydrogen sulphide addition and subsequent settling in a settler (not shown).

The sewage sludge thus provides a metabolizable carbon source in the reactor 12. In the reactor 12, the waste water moves horizontally from the inlet end thereof to the outer end, while flocs of solid matter settle into the valleys 16. The solids comprise RefCOD material, SBCOD material and RBCOD material. The RBCOD material is approximately 0.1 $\mu$m in size, and exits the reactor 12 along the flow line 30, as part of the treated waste water. This aqueous component can be subjected to known suspended/dissolved solids treatment (not shown). The solubilized material may be applied to nutrient removal operations.

The RefCOD and SBCOD material thus settled into the valley 16, is withdrawn along the lines 18, passes through the high shear pumps 20, and is recycled by means of the lines 22 to the reactor 12. Thus, in the reactor 12, there is hydrolysis of the solid and floc material into RefCOD, SBCOD and RBCOD material, together with fractionation of the RefCOD and SBCOD material into RBCOD material. Additionally, sulphate reduction is effected in the reactor 12.

A nitrogen purge enters the top of the reactor 12 along the line 26 and purges hydrogen sulphide which collects in the head space of the reactor. A gaseous stream comprising nitrogen and hydrogen sulphide passes along the line 28 to a hydrogen sulphide recovery stage (not shown). If desired, some or all of the sulphide removed along the flow line 28 can be added (not shown) to the line 14, ie to the influent stream, to initiate the hydrolysis reaction in the reactor 12.

Additionally, the redox potential in the head space of the reactor is controlled such that there is a build-up of sulphur in a surface layer of the water in the reactor. This surface layer is withdrawn as a sulphur-containing component along the line 32 and passes into the separation stage 34, where sulphur is separated from the water. The water is returned to the reactor 12 along the flow line 36, while the sulphur passes along the flow line 38 to the biological sulphur oxidation stage 40 where they are converted biologically to sulphates, which pass along the flow line 42 to the flow line 14. This thus constitutes a portion of the sulphates required for proper functioning of the reactor 12.

What is claimed is:

1. A process for treating water which contains carbonaceous solids, which process includes feeding water which contains carbonaceous solids which provide metabolizable organic carbon, into a biological hydrolysis reaction stage;

if the water is deficient in sulphate ions, adding sulphate ions to the water ahead of the reaction stage and/or in the reaction stage as the water passes along the reaction stage in the presence of sulphate ions, subjecting it to biological sulphate reduction in which sulphates in the waste water are converted to sulphides and during which the metabolizable organic carbon is metabolized by organisms involved in the biological sulphate reduction, with hydrolysis of the solids component thereof into non-digestible or refractory COD material, hereinafter also referred to as 'RefCOD material', slowly biodegradable COD material, hereinafter also referred to as 'SBCOD material', and readily biodegradable COD material, hereinafter also referred to as 'RBCOD material', taking place, with at least some of the RefCOD and SBCOD material having a larger particle size than the RBCOD material, so that at least some of the RefCOD and SBCOD material thus settles to the bottom of the reactor stage as the water passes along the reaction stage;

withdrawing, from the reactor, the RefCOD and SBCOD material that has settled to the bottom of the reactor, as a slurry component;

recycling the slurry component, with shearing thereof, to the reaction stage, so that, in addition to the hydrolysis, fractionation of the RefCOD and SBCOD material, into RBCOD material, occurs;

withdrawing, from the reactor, the treated water together with at least some of the RBCOD material; and withdrawing the sulphides from the reactor or oxidizing the sulphides to elemental sulphur in a surface layer of water in the reactor, and withdrawing this surface layer of water from the reactor.

2. A process according to claim 1, wherein the biological hydrolysis reaction stage comprises an accelerated hydrolysis reactor which comprises, at a bottom or base thereof, a plurality of valleys in which the settled RefCOD and SBCOD material collects.

3. A process according to claim 2, wherein the accelerated hydrolysis reactor comprises three of the valleys, with the settled material from each of the valleys being recycled to the inlet end of the reactor.

4. A process according to claim 1, wherein the carbonaceous solids-containing water is in the form of a concentrate, and is fed continuously into the reaction stage, with the withdrawal of the treated water and RBCOD material from the reaction stage being continuous, while the withdrawal of the slurry component and the sulphur-containing component from the reaction stage is either continuous or intermittent.

5. A process according to claim 4, wherein the carbonaceous solids-containing water is a waste water selected from sewage sludge; settled sewage; settled sewage solids; tannery waste water; brewery waste water; starch manufacture waste water; winery waste water; and paper pulp waste water, which all provide the metabolizable organic carbon and the necessary organisms for biological sulphate reduction in the reaction stage, and wherein the sulphur-containing component includes sulphides.

6. A process according to claim 4, wherein the carbonaceous solids-containing water is water which contains fine lignocellulosic material suspended therein, and which provides the metabolizable organic carbon and the necessary organisms for biological sulphate reduction in the reaction stage, and wherein the sulphur-containing component includes sulphides.

7. A process according to claim 5, which includes adding a source of sulphate ions to the carbonaceous solids-containing water ahead of the reaction stage and/or to the reaction stage itself.

8. A process according to claim 7, wherein the source of sulphate ions is mine effluent or industrial waste water.

9. A process according to claim 8, which includes pre-treating the mine effluent or industrial waste water to remove heavy metals therefrom, before the addition thereof to the carbonaceous solids-containing water or to the reactor as pretreated sulphate-containing waste water, with the pretreatment thereof including adding a sulphide to the mine effluent or industrial waste water, with the sulphide reacting with heavy metal(s) in the mine effluent or industrial waste water, thereby to cause precipitation of the heavy metal(s) from the mine effluent or industrial waste water as metal sulphides; and separating the precipitated metal sulphides from the waste water, to obtain the pretreated sulphate-containing waste water.

10. A process according to claim 9 wherein, in the pretreatment of the mine effluent or industrial waste water, the sulphide that is added thereto is hydrogen sulphide, with the separation of the precipitated metal sulphides from the pretreated sulphate-containing waste water being effected in a settler.

11. A process according to claim 7, wherein the source of sulphate ions is a sulphide-containing waste water and/or at least one sulphate salt.

12. A process according to claim 5, wherein at least some of the sulphides which form during the biological sulphate reduction are in the form of gaseous hydrogen sulphide, which collects in a head space of the reactor, with the withdrawal of the hydrogen sulphide as the, or as a portion of the, sulphur-containing component, including purging this head space with an inert gas and withdrawing a combined hydrogen sulphide/inert gas stream from the reactor head space.

13. A process according to claim 12, wherein the redox potential in the head space of the reactor is controlled so that oxidation of sulphides to elemental sulphur in a surface layer of water in the reactor takes place, with this sulphurous surface layer being withdrawn as part of the sulphur-containing component.

* * * * *